US012658365B2

(12) United States Patent (10) Patent No.: US 12,658,365 B2
Yun et al. (45) Date of Patent: Jun. 16, 2026

(54) MULTILAYER ELECTRONIC COMPONENT

(71) Applicant: SAMSUNG ELECTRO-MECHANICS CO., LTD., Suwon-si (KR)

(72) Inventors: Han Sol Yun, Suwon-si (KR); Sung Hyung Kang, Suwon-si (KR); Ji Won Kim, Suwon-si (KR); Min Goo Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 106 days.

(21) Appl. No.: 18/671,284

(22) Filed: May 22, 2024

(65) Prior Publication Data

US 2025/0069804 A1 Feb. 27, 2025

(30) Foreign Application Priority Data

Aug. 23, 2023 (KR) ........................ 10-2023-0110629

(51) Int. Cl.
*H01G 4/30* (2006.01)
*H01G 2/10* (2006.01)
*H01G 2/14* (2006.01)

(52) U.S. Cl.
CPC ............... *H01G 2/103* (2013.01); *H01G 2/14* (2013.01); *H01G 4/30* (2013.01)

(58) Field of Classification Search
CPC ............ H01G 2/103; H01G 2/14; H01G 4/30; H01G 4/1209; H01G 4/224; H01G 4/1227;
(Continued)

(56) References Cited

U.S. PATENT DOCUMENTS 10,304,629 B2 5/2019 Kitamura et al.
2004/0145856 A1* 7/2004 Nakamura ............... H01G 4/30
361/311
(Continued)

FOREIGN PATENT DOCUMENTS

JP 2016-113355 A 6/2016
JP 2021-125673 A 8/2021
JP 2023-063887 A 5/2023

OTHER PUBLICATIONS

Extended European Search Report issued on Feb. 28, 2025 in European Patent Application No. 24179546.7.

*Primary Examiner* — Timothy J. Dole
*Assistant Examiner* — Esther N Lian
(74) *Attorney, Agent, or Firm* — Morgan, Lewis & Bockius LLP

(57) ABSTRACT

A multilayer electronic component includes a body including a capacitance forming portion including a dielectric layer and an internal electrode, alternately arranged in a first direction, and a cover portion disposed on both surfaces of the capacitance forming portion opposing the first direction; and an external electrode disposed outside the body and connected to the internal electrode, wherein the cover portion includes a first dielectric material having a perovskite structure represented by the formula $ABO_3$, and a first metal including one or more of Cu, W, Ag, and Zn, and wherein, in at least a portion of the cover portion, an amount of the first metal is 2.0 mole or more and 9.0 mole or less, based on 100 mole of an element of B.

14 Claims, 4 Drawing Sheets

(58) Field of Classification Search
CPC ........ H01G 4/1245; H01G 4/002; H01G 2/08;
H01G 4/005; H01G 4/12; H01G 4/258;
H01G 4/10; H01G 4/2325; H01G 4/248;
C04B 35/465; C04B 35/49; C04B
2235/3213; C04B 2235/3225; C04B
2235/3244; C04B 2235/3262; C04B
2235/3418; C04B 2235/40; C04B
2235/404; C04B 2235/407; C04B
2235/408; C04B 2235/85; C04B
2235/3208; Y02E 60/13
See application file for complete search history.

(56)                References Cited

U.S. PATENT DOCUMENTS

| | | | |
|---|---|---|---|
| 2011/0019333 A1* | 1/2011 | Yao | C04B 35/4682 |
| | | | 501/137 |
| 2016/0118188 A1* | 4/2016 | Wada | C04B 35/4682 |
| | | | 29/25.42 |
| 2016/0172107 A1* | 6/2016 | Yoon | H01G 4/30 |
| | | | 501/137 |
| 2016/0329152 A1* | 11/2016 | Takeda | C04B 35/6261 |
| 2017/0271082 A1 | 9/2017 | Yoon et al. | |
| 2018/0174754 A1 | 6/2018 | Kitamura et al. | |
| 2019/0279817 A1* | 9/2019 | Park | H01G 4/1263 |
| 2020/0051748 A1* | 2/2020 | Park | H01G 4/1227 |
| 2020/0411239 A1 | 12/2020 | Yoon et al. | |
| 2020/0411248 A1* | 12/2020 | Hashimoto | H01G 4/1227 |
| 2021/0188713 A1 | 6/2021 | Lee et al. | |
| 2023/0128407 A1* | 4/2023 | Masuda | H01G 4/30 |
| | | | 361/301.4 |

* cited by examiner

FIRST
DIRECTION

SECOND
DIRECTION

I-I'

FIRST
DIRECTION

THIRD
DIRECTION

II-II'

K1

MULTILAYER ELECTRONIC COMPONENT

CROSS-REFERENCE TO RELATED APPLICATION(S)

This application claims benefit of priority to Korean Patent Application No. 10-2023-0110629 filed on Aug. 23, 2023 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, may be a chip-type condenser mounted on the printed circuit boards of any of various electronic products, such as an image display device, including a liquid crystal display (LCD) or a plasma display panel (PDP), a computer, a smartphone, or a mobile phone, serving to charge or discharge electricity therein or therefrom.

Recently, with expansion of an electric vehicle market, use of a high-temperature and high-voltage multilayer ceramic capacitor having an operating voltage of 250V or more is expanding in a circuit such as an automobile high-voltage battery charger (OBC), a DC/DC converter, or the like.

In a high temperature and high pressure environment of the above level, an auto heat dissipation phenomenon may occur due to dielectric loss of a multilayer ceramic capacitor and metal resistance included in internal and external electrodes. Since such a heat dissipation phenomenon accelerates deterioration of a dielectric layer and shortens lifespan of the multilayer ceramic capacitor, research is needed to improve heat dissipation of the multilayer ceramic capacitor.

SUMMARY

An aspect of the present disclosure is to effectively dissipate heat generated in a multilayer electronic component to improve reliability of the multilayer electronic component.

However, the object of the present disclosure is not limited to the above, and will be more easily understood in the process of describing specific embodiments of the present disclosure.

According to an aspect of the present disclosure, a multilayer electronic component includes a body including a capacitance forming portion including a dielectric layer and an internal electrode, alternately arranged in a first direction, and a cover portion disposed on both surfaces of the capacitance forming portion opposing the first direction; and an external electrode disposed outside the body and connected to the internal electrode, wherein the cover portion includes a first dielectric material having a perovskite structure represented by the formula $ABO_3$, and a first metal including one or more of Cu, W, Ag, and Zn, and wherein, in at least a portion of the cover portion, an amount of the first metal is 2.0 mole or more and 9.0 mole or less based on 100 mole of an element of B.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
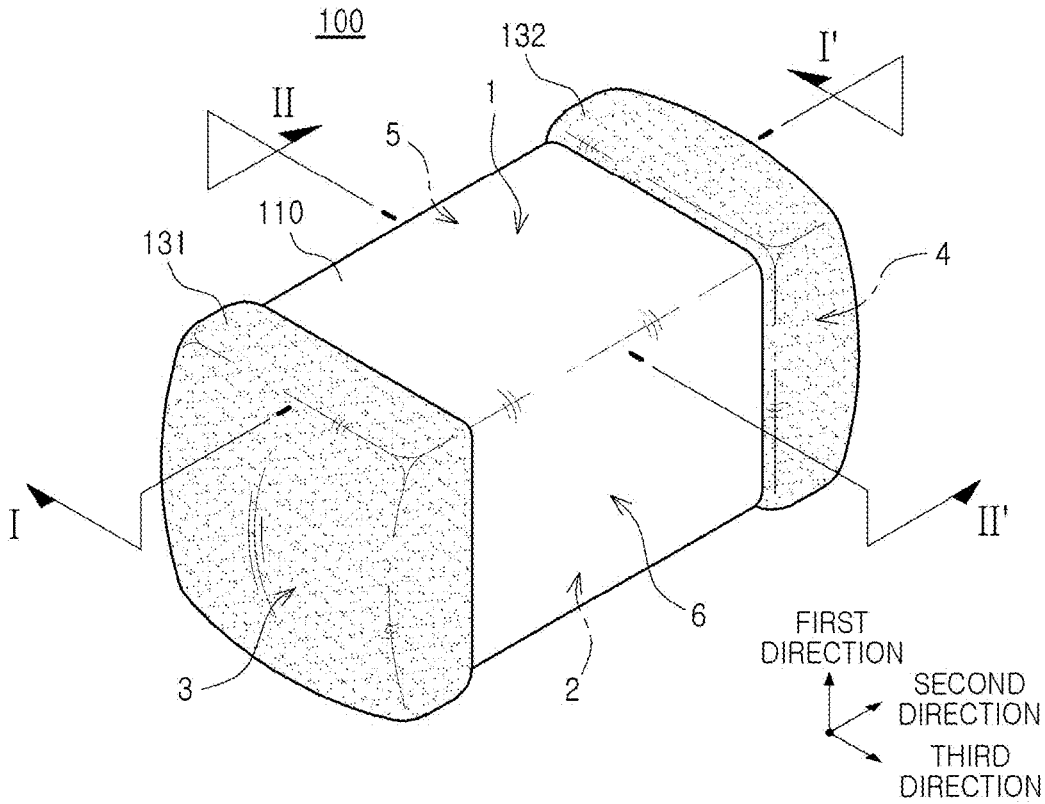
FIG. 1 is a perspective view schematically illustrating a multilayer electronic component according to an embodiment of the present disclosure.

Hereinafter, embodiments of the present disclosure will be described with reference to specific example embodiments and the attached drawings. The embodiments of the present disclosure may, however, be exemplified in many different forms and should not be construed as being limited to the specific embodiments set forth herein. The example embodiments disclosed herein are provided for those skilled in the art to better explain the present disclosure. In the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily illustrated for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a thickness T direction, a second direction may be defined as a length L direction, and a third direction may be defined as a width W direction.

Multilayer Electronic Component

FIG. 1 is a perspective view schematically illustrating a multilayer electronic component according to an embodiment of the present disclosure.

Figure 2:
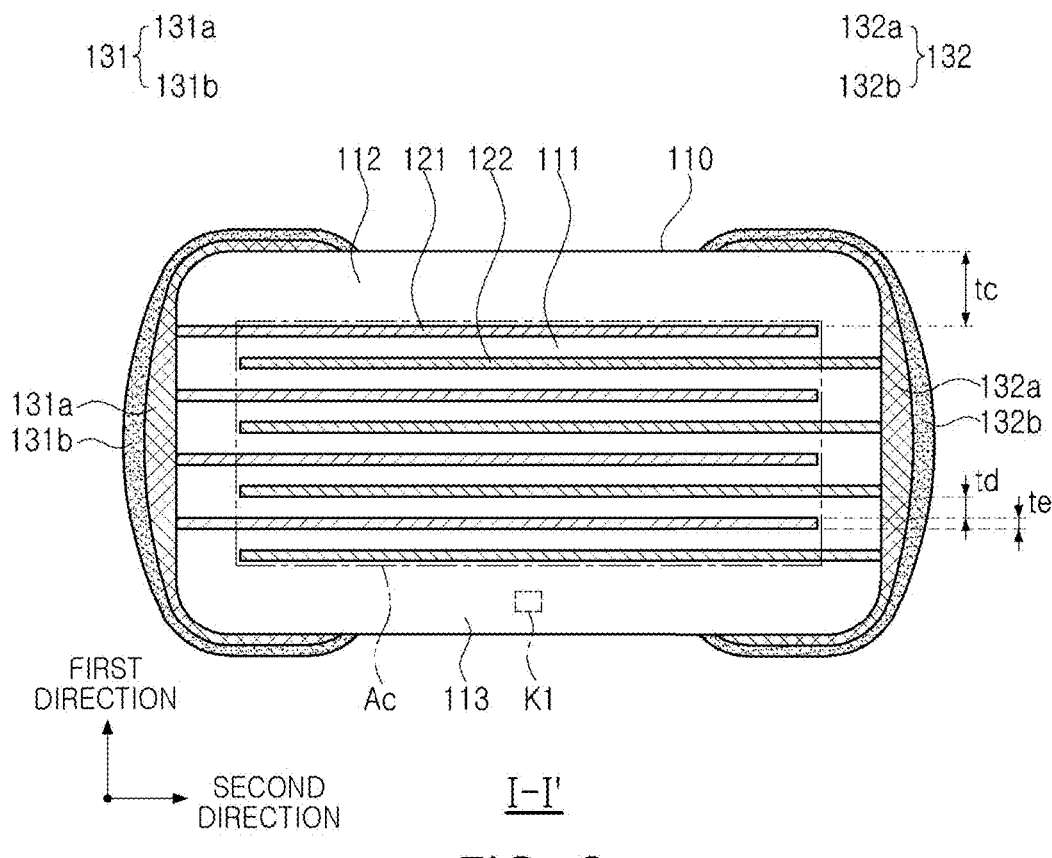
FIG. 2 is a cross-sectional view schematically illustrating a cross-section of FIG. 1, taken along line I-I'.

FIG. 2 is a cross-sectional view schematically illustrating a cross-section of FIG. 1, taken along line I-I'.

Figure 3:
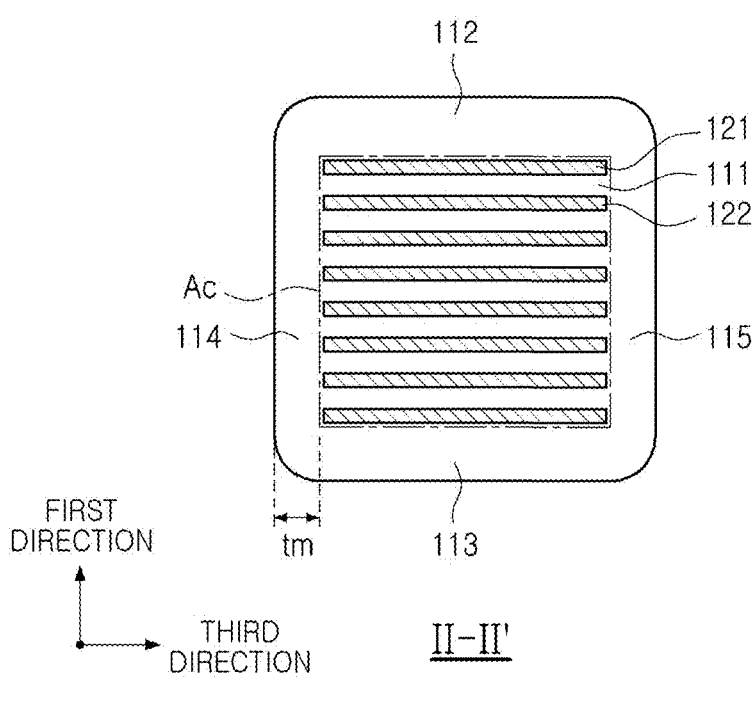
FIG. 3 is a cross-sectional view schematically illustrating a cross-section of FIG. 1, taken along line II-II'.

FIG. 3 is a cross-sectional view schematically illustrating a cross-section of FIG. 1, taken along line II-II'.

Figure 4:
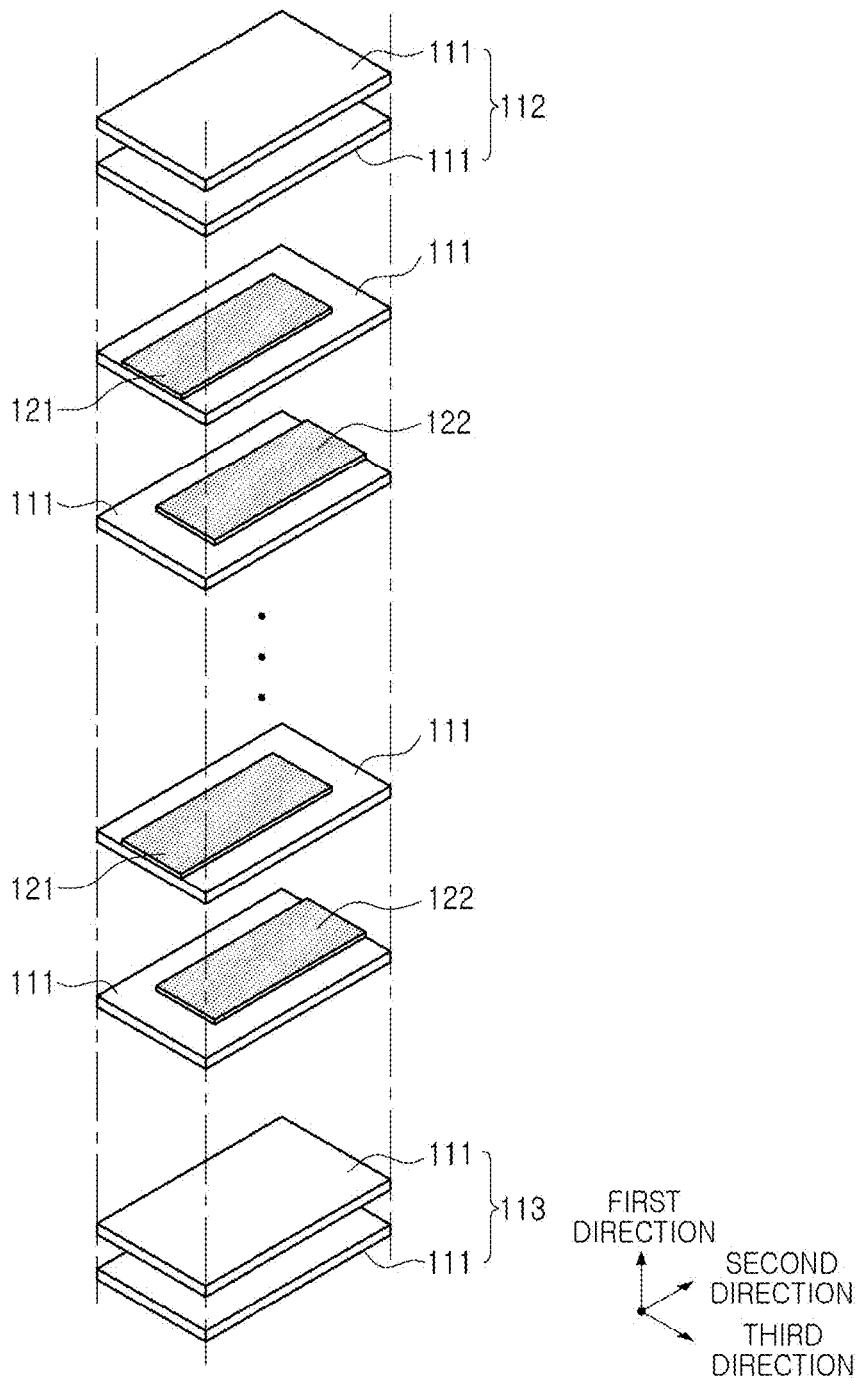
FIG. 4 is an exploded perspective view schematically illustrating a body of a multilayer electronic component according to an embodiment of the present disclosure.

FIG. 4 is an exploded perspective view schematically illustrating a body of a multilayer electronic component according to an embodiment of the present disclosure.

Figure 5:
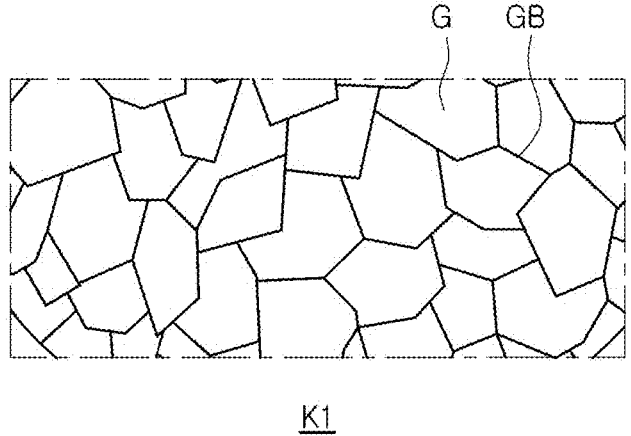
FIG. 5 is an enlarged view of portion K1 in FIG. 2.

FIG. 5 is an enlarged view of portion K1 in FIG. 2.

Hereinafter, a multilayer electronic component 100 according to an embodiment of the present disclosure will be described with reference to FIGS. 1 to 5. In addition, a multilayer ceramic capacitor (hereinafter referred to as 'MLCC') will be described as an example of the multilayer electronic component, but the present disclosure is not limited thereto, and may also be applied to various multilayer electronic components, such as an inductor, a piezoelectric element, a varistor, a thermistor, or the like.

A multilayer electronic component 100 according to some embodiments of the present disclosure may include a body 110 including a capacitance forming portion Ac including a dielectric layer 111 and an internal electrode (121 and 122), and a cover portion (112 and 113), and an external electrode (131 and 132).

Although the detailed shape of the body 110 is not particularly limited, as illustrated, the body 110 may have a hexahedral shape or a shape similar thereto. Due to shrinkage of ceramic powder included in the body 110 during a sintering process or polishing of corners, the body 110 may not have a hexahedral shape with perfectly straight lines, but may substantially have a hexahedral shape.

The body 110 may have first and second surfaces 1 and 2 opposing in a first direction, third and fourth surfaces 3 and 4 connected to the first and second surfaces 1 and 2 and opposing in a second direction, and fifth and sixth surfaces 5 and 6 connected to the first to fourth surfaces 1, 2, 3, and 4 and opposing in a third direction.

The body 110 may include the capacitance forming portion Ac including the dielectric layer 111 and the internal electrode (121 and 122), alternately arranged in the first direction, and the cover portion (112 and 113) disposed on both surfaces of the capacitance forming portion Ac opposing in the first direction.

The capacitance forming portion Ac may be disposed inside the body 110, and may include first and second internal electrodes 121 and 122 alternately disposed with the dielectric layer 111 interposed therebetween, to form capacitance of the multilayer electronic component 100. The cover portion (112 and 113) may include a first cover portion 112 and a second cover portion 113 respectively disposed on both surfaces of the capacitance forming portion Ac opposing in the first direction. The cover portion (112 and 113) may basically serve to prevent damage to the capacitance forming portion Ac due to physical or chemical stress.

According to some embodiments of the present disclosure, the cover portion (112 and 113) may include a first dielectric material having a perovskite structure represented by the formula $ABO_3$, and a first metal. An element of A may include, for example, Ca, and an element of B may include, for example, Zr. The first dielectric material may include, for example, $(Ca_{1-x}Sr_x)(Zr_{1-y}Ti_y)O_3$, where x is $0 \leq x \leq 0.5$, and y is $0 \leq y \leq 0.5$. A detailed description of the first dielectric material will be provided later.

As described above, an auto heat dissipation phenomenon of the multilayer electronic component 100 may occur in a high-temperature and high-pressure environment, and such a heat dissipation phenomenon may accelerate deterioration of the dielectric layer 111, and may shorten lifespan of the multilayer electronic component 100. Heat generated in the multilayer electronic component 100 may be emitted to the outside of the multilayer electronic component 100 through the internal electrode (121 and 122) and the external electrode (131 and 132) having metal with thermal conductivity, as a main component, relatively higher than the dielectric layer 111 and the cover portion (112 and 113), including the first dielectric material as a main component. Since an area occupied by the cover portion (112 and 113) of an outer surface of the multilayer electronic component 100 may be significant, it is necessary to activate heat dissipation through the cover portion (112 and 113).

Therefore, in some embodiments of the present disclosure, since the cover portion (112 and 113) constituting a portion of the outer surface of the multilayer electronic component 100 may include the first metal, heat generated in the multilayer electronic component 100 may also be emitted through the cover portion (112 and 113) to improve reliability of the multilayer electronic component 100.

For example, the first metal may include one or more of Cu, W, Ag, and Zn. Cu, W, Ag, and Zn may be metal elements that have excellent thermal conductivity among metal elements, and may thus effectively dissipate heat generated in the multilayer electronic component 100. More preferably, the first metal may include Cu. Cu may have a thermal conductivity of about 397 W/(m·K) at 20° C., which may be the element with the second highest thermal conductivity among metal elements, and may be also inexpensive, and thus the first metal may include Cu.

However, since the first metal may be a conductive material, as an amount of the first metal included in the cover portion (112 and 113) increases, insulation of the cover portion (112 and 113) may decrease, and as a result, the multilayer electronic component 100 may lower insulation resistance or reduce moisture resistance reliability.

Therefore, in some embodiments of the present disclosure, it is preferable that an amount of the first metal in at least a portion of the cover portion (112 and 113) may be 2.0 mole or more and 9.0 mole or less, based on 100 mole of an element of B. According to some embodiments, in at least a portion of the cover portion (112 and 113), the amount of the first metal may be 2.0 mole or more and 6.0 mole or less, based on 100 mole of the element of B. In at least a portion of the cover portion (112 and 113), when the amount of the first metal is less than 2.0 mole, based on 100 mole of the element of B, a heat dissipation effect of the present disclosure may be minimal, and when the amount of the first metal exceeds 9.0 mole, based on 100 mole of the element of B, insulation resistance of the multilayer electronic component 100 may decrease, or moisture resistance reliability of the multilayer electronic component 100 may decrease.

There may be no need to specifically limit a method of measuring the amount of the first metal included in the cover portion (112 and 113). For example, after obtaining images of cross-sections in the first and second directions cut from a center of the body 110 in the third direction using a scanning electron microscope (SEM), an amount (at %) of an element of B and an amount (at %) of the first metal may be measured by energy dispersive spectroscopy (EDS) with regard to random regions in the cover portion (112 and 113), and through this, the amount of the first metal, based on 100 mole of the element of B, may be determined. In addition, the amount of the first metal included in the cover portion (112 and 113) may also mean an averaged value by measuring the number of mole of the first metal, based on 100 mole of the element of B, at 10 or more equally spaced points in the first direction, and averaging the number of measured mole. For example, an average amount of the first metal included in the cover portion (112 and 113) may be 2.0 mole or more and 9.0 mole or less, based on 100 mole of the element of B. Additionally, the amount of the first metal included in the cover portion (112 and 113) may be determined using a measurement method commonly used in the art.

In some embodiments, the cover portion (112 and 113) may have a standard deviation of an amount of the first metal of 3.0 mole or less, based on 100 mole of the element of B, in the first direction. For example, the amount of the first metal in the cover portion (112 and 113) may be relatively uniform based in the first direction. To effectively dissipate heat generated in the capacitance forming portion Ac through an outer surface of the cover portion (112 and 113), it is desirable for the first metal having high thermal conductivity to be uniformly distributed in the first direction.

An example of a method of measuring the standard deviation of the amount of the first metal, based on 100 mole of the element of B, in the first direction, will be described. For example, after obtaining images of cross-sections in the first and second directions cut from a center of the body 110 in the third direction using a scanning electron microscope (SEM), 10 or more, 20 or more, or 30 or more equally spaced points from the cover portion (112 and 113) in the first direction may be analyzed using energy dispersive spectroscopy (EDS). In this case, an amount (at %) of an element of B and an amount (at %) of the first metal at each of the points may be measured, and through this, the number of mole of the first metal, based on 100 mole of the element of B, at each of the points, may be measured. The standard deviation of the amount of the first metal may be obtained by calculating variance of the measured number of mole of the first metal at each of the points and then taking a square root of the variance.

Referring to FIG. 5, the first dielectric material may include a plurality of dielectric grains G and a grain boundary GB disposed between adjacent dielectric grains. In this case, at least a portion of the first metal may be included in the plurality of dielectric grains G. For example, Cu, W, Ag, Zn, or the like may be included in the dielectric grains G by replacing an element of A or an element of B of the first dielectric material.

However, the present disclosure is not limited thereto, and when the amount of the first metal increases and the first metal is overly included in the dielectric grains G, at least a portion of the first metal may exist in the grain boundary GB.

There may be no need to specifically limit a thickness of the cover portion (112 and 113). To miniaturize and increase capacitance of the multilayer electronic component, an average thickness tc of the cover portion (112 and 113) may be 600 μm or less, 400 μm or less, 200 μm or less, 100 μm or less, or 20 μm or less. The average thickness tc of the cover portion (112 and 113) may be, for example, 5 μm or more, 20 μm or more, 100 μm or more, 200 μm or more, or 500 μm or more, but the present disclosure is not limited thereto. In this case, the average thickness of the cover portion (112 and 113) means an average thickness of the first cover portion 112 and an average thickness of the second cover portion 113, respectively.

The average thickness tc of the cover portion (112 and 113) may mean an average size of the cover portion (112 and 113) in the first direction, and may be measured in the first direction cut from the center of the body 110 in the third direction, and may be an averaged value of sizes of the cover portion in the first direction measured at five equally spaced points in the second direction, in images observed from cross-sections in the first and second directions cut from a center of the body 110 in the third direction using a scanning electron microscope (SEM).

The capacitance forming portion Ac of the body 110 may include the dielectric layer 111 and the internal electrode (121 and 122), alternately stacked. A plurality of dielectric layers 111 forming the body 110 may be in a sintered state, and a boundary between adjacent dielectric layers 111 may be integrated to the extent that it is difficult to confirm without using a scanning electron microscope (SEM).

The dielectric layer 111 may include the first dielectric material. The element of A may include, for example, Ca, and the element of B may include, for example, Zr. For example, the first dielectric material included in the dielectric layer 111 may include, for example, $(Ca_{1-x}Sr_x)(Zr_{1-y}Ti_y)O_3$, where x is $0 \leq x \leq 0.5$, and y is $0 \leq y \leq 0.5$. The dielectric layer 111 may include the first dielectric material as a main component. The element B may not be the first metal.

When using a ferroelectric material such as barium carbonate ($BaTiO_3$) or the like as a dielectric material applied to the dielectric layer 111, it has a high dielectric constant at room temperature, but problems of occurring piezoelectric cracks or reducing capacitance may occur in a high-temperature and high-pressure environment.

A paradielectric $CaZrO_3$-based perovskite compound may have characteristics of small dielectric constant change and small dielectric loss by temperature change. For example, by using a $CaZrO_3$-based compound as the first dielectric material included in the dielectric layer 111, a temperature change rate of capacitance and dielectric loss may be lowered to ensure high-temperature reliability of the multilayer electronic component. For example, when the cover portion (112 and 113) includes the first metal, and the dielectric layer 111 includes the first dielectric material, the multilayer electronic component 100 may obtain excellent heat dissipation characteristics and electrical characteristics at high temperature and high pressure.

The dielectric layer 111 may include other minor components. For example, the dielectric layer 111 may include a first minor component including one or more of Mn, V, Cr, Fe, Ni, and Co. For example, the dielectric layer 111 may include the first minor component including Mn, and the first minor component may be Mn. The first minor component may serve to provide reduction resistance, improve densification of a microstructure, and maintain a high temperature lifespan.

An amount of the first minor component does not need to be specifically limited, but in at least a portion of the dielectric layer 111, the amount of the first minor component may be 0.1 mole or more and 2.0 mole or less, based on 100 mole of the element of B. When the amount of the first minor component is less than 0.1 mole, based on 100 mole of the element of B, reduction resistance and reliability may be reduced, and when the amount is more than 2.0 mole, side effects such as increased sintering temperature and lowered high-temperature withstand voltage may occur.

The dielectric layer 111 may include a second minor component including one or more of, for example, Y, Dy, Ho, La, Ce, Nd, Sm, Gd, Er, and Zr. For example, the dielectric layer 111 may include the second minor component including Y, and the second minor component may be Y. The second minor component may play a role in improving reliability by controlling grain growth and homogenizing distribution of dielectric grains.

An amount of the second minor component does not need to be specifically limited, but in at least a portion of the dielectric layer 111, the amount of the second minor component may be 0.1 mole or more and 2.0 mole or less, based on 100 mole of the element of B.

The dielectric layer 111 may include a third minor component including Si, for example. The third minor component may play a role in lowering a sintering temperature to promote sintering properties.

An amount of the third minor component does not need to be specifically limited, but in at least a portion of the dielectric layer 111, the amount of the third minor component may be 0.1 mole or more and 2.0 mole or less, based on 100 mole of the element of B. When the amount of the third minor component is less than 0.1 mole, based on 100 mole of the element of B, a density of the dielectric layer may be reduced, and when the amount is more than 2.0 mole, withstand voltage characteristics may be reduced due to occurrence of a secondary phase.

It is desirable for the cover portion (112 and 113) to also include the first to third minor components. Additionally, in at least a portion' of the cover portion (112 and 113), the amount of the first minor component may be 0.1 mole or more and 2.0 mole or less, based on 100 mole of the element of B, the amount of the second minor component may be 0.1 mole or more and 2.0 mole or less, based on 100 mole of the element of B, and the amount of the third minor component may be 0.1 mole or more and 2.0 mole or less, based on 100 mole of the element of B.

In some embodiments, the dielectric layer 111 may not include the first metal. The first metal included in the cover portion (112 and 113) may improve heat dissipation characteristics of the multilayer electronic component 100 without significantly affecting electrical characteristics of the multilayer electronic component 100. When the dielectric layer 111 includes the first metal, which may be a conductor, insulation resistance of the multilayer electronic component 100 may be reduced or short circuit defects or the like may be caused.

Therefore, when the dielectric layer 111 includes the first metal, a concentration of the first metal included in the dielectric layer 111 may be lower than a concentration of the first metal included in the cover portion (112 and 113).

The internal electrode (121 and 122) may be arranged alternately with the dielectric layer 111. For example, a first internal electrode 121 and a second internal electrode 122, which may be a pair of electrodes with different polarities, may be arranged to face each other with the dielectric layer 111 interposed therebetween. The first internal electrode 121 and the second internal electrode 122 may be electrically separated from each other by the dielectric layer 111 disposed therebetween.

The first internal electrode 121 may be disposed to be spaced apart from the fourth surface 4 and extend toward the third surface 3. The second internal electrode 122 may be disposed to be spaced apart from the third surface 3 and extend toward the fourth surface 4.

A conductive metal included in the internal electrode (121 and 122) does not need to be particularly limited, but may include, for example, one or more of Ni, Cu, Pd, Ag, Au, Pt, Sn, W, Ti, and alloys thereof.

The internal electrode (121 and 122) may include Ni as a main component, for example. In this case, the main component means a component of 50 at % or more, among components constituting the internal electrode (121 and 122). When the dielectric layer 111 includes a $CaZrO_3$-based compound as a main component and the internal electrode (121 and 122) includes Ni as a main component, and the dielectric layer 111 and the internal electrode (121 and 122) are simultaneously sintered, the $CaZrO_3$-based compound may be reduced to deteriorate dielectric properties. Therefore, in some embodiments, the internal electrode (121 and 122) may include Cu as a main component, which has superior oxidation resistance compared to Ni. When the internal electrode (121 and 122) include Cu as a main component, reduction of the $CaZrO_3$-based compound may be easily prevented.

An average thickness td of the dielectric layer 111 does not need to be particularly limited, but may be, for example, 1.0 μm or more and 50.0 μm or less. An average thickness te of the internal electrode (121 and 122) does not need to be particularly limited, but may be, for example, 0.5 μm or more and 3.0 μm or less. In some embodiments, the average thickness td of the dielectric layer 111 may be greater than twice the average thickness of the internal electrode (121 and 122). For example, td>2×te may be satisfied. In an electronic component for a high-voltage electric/electronic device, breakdown voltage characteristics may be improved by making the average thickness of the dielectric layer 111 greater than twice the average thickness of the internal electrode (121 and 122) to prevent a decrease in breakdown voltage under a high voltage environment.

The average thickness td of the dielectric layer 111 and the average thickness te of the internal electrode (121 and 122) mean a size of the dielectric layer 111 and a size of the internal electrode (121 and 122) in the first direction, respectively. The average thickness td of the dielectric layer 111 and the average thickness te of the internal electrode (121 and 122) may be determined by scanning cross-sections of the body 110 in the first and second directions using a scanning electron microscope (SEM) at 10,000 magnification. More specifically, the average thickness td of the dielectric layer 111 may be determined by measuring thicknesses at multiple points of one dielectric layer 111, for example, 30 equally spaced points in the second direction to obtain an average value thereof. In addition, the average thickness te of the internal electrode (121 and 122) may be determined by measuring thicknesses at multiple points of one internal electrode (121 and 122), for example, at 30 equally spaced points in the second direction to obtain an average value thereof. The 30 equally spaced points may be designated in the capacitance forming portion Ac. When such average value measurement is performed on each of 10 dielectric layers 111 and 10 internal electrode (121 and 122) and then the average value is determined, the average thickness td of the dielectric layer 111 and the average thickness te of the internal electrode (121 and 122) may be further generalized.

The body 110 may include a first margin portion 114 and a second margin portion 115, respectively disposed on both surfaces of the capacitance forming portion Ac opposing in the third direction. For example, the margin portion (114 and 115) may refer to a region between both ends of the internal electrode (121 and 122) and a boundary surface of the body 110 in cross-sections of the body 110 in the first and third directions.

The margin portion (114 and 115) may include a material, identical to a material of the dielectric layer 111 except that the margin portion (114 and 115) does not include the internal electrode (121 and 122). In some embodiments, the margin portion (114 and 115) may not include the first metal. The margin portion (114 and 115) may have a greater influence on the dielectric layer 111 and the internal electrode (121 and 122), as compared to the cover portion (112 and 113). Therefore, when the margin portion (114 and 115) includes the first metal, which may be a conductor, insulation resistance of the multilayer electronic component 100 may be reduced or short circuit defects or the like may be caused. When the margin portion (114 and 115) includes the first metal, a concentration of the first metal included in the margin portion (114 and 115) may be lower than a concentration of the first metal included in the cover portion (112 and 113).

The margin portion (114 and 115) may be formed by applying and sintering a conductive paste on a ceramic green sheet, except for a region in which the margin portions are formed. Alternatively, to suppress a step difference, after stacking, the internal electrode (121 and 122) and the auxiliary electrode (123 and 124) may be cut to expose the fifth and sixth surfaces 5 and 6 of the body, and then a single dielectric layer or two or more dielectric layers may be stacked on both surfaces of the capacitance forming portion Ac facing in the third direction, to form the margin portion (114 and 115).

There may be no need to specifically limit an average thickness tm of the margin portion (114 and 115). However, to miniaturize and increase capacitance of the multilayer electronic component, the average thickness tm of the margin portion (114 and 115) may be 500 μm or less, 400 μm or less, 100 μm or less, 50 μm or less, or 20 μm or less. In this case, the average thickness of the margin portion (114 and 115) refers to an average thickness of the first margin portion 114 and an average thickness of the second margin portion 115, respectively.

The average thickness of the margin portion (114 and 115) may mean an average value of sizes of the margin portion (114 and 115) in the third direction, and may be measured at five equally spaced points, based on cross-sections of the body 110 in the first and third directions.

The external electrodes 131 and 132 may be disposed on the third and fourth surfaces 3 and 4 of the body 110, and may be disposed to extend on portions of the first, second, fifth, and sixth surfaces 1, 2, 5, and 6. The external electrodes 131 and 132 may include a first external electrode 131 connected to the first internal electrode 121, and a second external electrode 132 connected to the second internal electrode 122.

The external electrodes 131 and 132 may include electrode layers 131*a* and 132*a* disposed on the third and fourth surfaces 3 and 4 and connected to the internal electrode (121 and 122), respectively, and plating layers 131*b* and 132*b* disposed on the electrode layers 131*a* and 132*a*, respectively. Specifically, the first external electrode 131 may include a first electrode layer 131*a* disposed on the third surface 3 and connected to the first internal electrode 121, and a first plating layer 131*b* disposed on the first electrode layer 131*a*, and the second external electrode 132 may include a second electrode layer 132*a* disposed on the fourth surface 4 and connected to the second internal electrode 122, and a second plating layer 132*b* disposed on the second electrode layer 132*a*.

The electrode layers 131*a* and 132*a* may include a metal and glass. The metal included in the electrode layers 131*a* and 132*a* may serve to secure electrical connectivity, and the glass may serve to improve bonding force with the body 110.

The metal included in the electrode layers 131*a* and 132*a* may be formed using any material as long as it has electrical conductivity, and the specific material may be determined in consideration of electrical characteristics, structural stability, or the like. For example, the metal included in the electrode layers 131*a* and 132*a* may be one or more selected from the group consisting of nickel (Ni), copper (Cu), palladium (Pd), silver (Ag), gold (Au), platinum (Pt), tin (Sn), tungsten (W), titanium (Ti), and alloys thereof.

The electrode layers 131*a* and 132*a* may be composed of only a single layer containing metal and glass, but the present disclosure is not limited thereto, and the electrode layers 131*a* and 132*a* may have a multilayer structure.

For example, the electrode layers 131*a* and 132*a* may include a first layer including metal and glass, and a second layer disposed on the first layer and including metal and a resin. As the electrode layers 131*a* and 132*a* include the second layer, bending strength of the multilayer electronic component 100 may be improved.

The metal included in the second layer is not particularly limited, and may include one or more selected from the group consisting of nickel (Ni), copper (Cu), palladium (Pd), silver (Ag), gold (Au), platinum (Pt), tin (Sn), tungsten (W), titanium (Ti), and alloys thereof.

The metal included in the second layer may include one or more of spherical powder and flake-shaped powder. For example, the metal included in the second layer may be made of only the flake-shaped powder, only the spherical powder, or may be a mixture of the flake-shaped powder and the spherical powder. In this case, the spherical powder may also include a shape that may not be completely spherical, for example, a shape in which a length ratio of a major axis and a minor axis (major axis/minor axis) is 1.45 or less. The flake-shaped powder refers to a powder having a flat and elongated shape, and is not particularly limited, but for example, the length ratio of the major axis to the minor axis (major axis/minor axis) may be 1.95 or more. Lengths of the major and minor axes of the spherical powder and the flake-shaped powder may be measured from images obtained by scanning cross-sections in the first and second directions cut from a central portion in the third direction of the multilayer electronic component with a scanning electron microscope (SEM).

The resin included in the second layer may secure bondability and absorb shock. The resin is not particularly limited as long as it has bonding properties and shock absorption properties, and may be mixed with a metal powder to make a paste, and may include, for example, one or more types selected from an epoxy resin, an acrylic resin, an ethyl cellulose, or the like.

Additionally, the second layer may include a plurality of metal particles, an intermetallic compound, and a resin. By including the intermetallic compound, electrical connectivity with the first layer may be further improved. The intermetallic compound serves to improve electrical connectivity by connecting the plurality of metal particles, and may serve to surround and connect the plurality of metal particles to each other.

In this case, the intermetallic compound may include a metal having a melting point lower than a curing temperature of the resin. For example, because the intermetallic compound may include the metal having a melting point lower than a curing temperature of the resin, the metal may melt during drying and curing processes, may form some of the metal particles and the intermetallic compound, and may surround the metal particle. In some embodiments, the intermetallic compound may include a low melting point metal of 300° C. or lower.

In some embodiments, the second layer may include Sn. During the drying and curing processes, Sn may melt, and the melted Sn may wet high melting point metal particles such as Ag, Ni or Cu by capillary action, and may react with some of the Ag, Ni or Cu metal particles, to form intermetallic compounds such as $Ag_3Sn$, $Ni_3Sn_4$, $Cu_6Sn_5$, $Cu_3Sn$, or the like. Ag, Ni or Cu that did not participate in the reaction may remain in the form of metal particles.

Therefore, the plurality of metal particles may include one or more of Ag, Ni, and Cu, and the intermetallic compound may include one or more of $Ag_3Sn$, $Ni_3Sn_4$, $Cu_6Sn_5$, and $Cu_3Sn$.

The plating layers 131*b* and 132*b* may improve mounting characteristics. Types of the plating layers 131*b* and 132*b* are not particularly limited, and may be plating layers containing nickel (Ni), tin (Sn), palladium (Pd), and/or an alloy containing these, and may be formed as a plurality of layers. The plating layers 131*b* and 132*b* may be, for example, a nickel (Ni) plating layer or a tin (Sn) plating layer, or may be prepared by sequentially forming the nickel (Ni) plating layer and the tin (Sn) plating layer. Additionally, the plating layers 131*b* and 132*b* may include a plurality of nickel (Ni) plating layers and/or a plurality of tin (Sn) plating layers.

Although the drawing illustrates a structure in which the multilayer electronic component 100 has two external electrodes 131 and 132, it is not limited thereto, and the number, shapes, or the like of the external electrodes 131 and 132 may be changed depending on other purposes.

A size of the multilayer electronic component 100 does not need to be particularly limited. An embodiment of the present disclosure may improve high-temperature reliability of multilayer electronic components for high temperature and high pressure. Especially, when the size of the multilayer electronic component 100 is 3216 (length×width, 3.2 mm×1.6 mm) or more, an effect of improving heat dissipation characteristics and electrical characteristics at high temperature and high pressure of the present disclosure may be more noticeable. For example, when a maximum size of the multilayer electronic component 100 in the second direction is 3.2 mm or more and a maximum size of the multilayer electronic component 100 in the third direction is 1.6 mm or more, an effect of improving reliability according to the present disclosure may be more noticeable.

Hereinafter, an example of a manufacturing method of the above-described multilayer electronic component 100 will be described.

First, a first dielectric material powder for forming a dielectric layer 111 may be prepared. The first dielectric material powder may include, for example, $(Ca_{1-x}Sr_x)(Zr_{1-y}Ti_y)O_3$, where x is $0 \le x \le 0.5$, and y is $0 \le y \le 0.5$. The first dielectric material powder may be synthesized by known methods such as a solid-state reaction method, a hydrothermal synthesis method, a coprecipitation method, an alkaline hydrolysis method, or the like. Separately from the first dielectric material powder, a minor component powder may be prepared. The minor component powder may include, for example, first to third minor component powder particles. The first minor component powder may include an oxide or carbonate containing one or more of Mn, V, Cr, Fe, Ni, and Co. The second minor component powder may include an oxide or carbonate containing one or more of Y, Dy, Ho, La, Ce, Nd, Sm, Gd, Er, and Zr. The third minor component powder may include an oxide or carbonate containing Si.

Next, the first dielectric material powder and the minor component powder particles, which have been prepared, an organic solvent such as ethanol or the like, and a binder such as polyvinyl butyral or the like, may be mixed to prepare a slurry for the dielectric layer, and the slurry for the dielectric layer may be applied and dried on a carrier film to prepare a green sheet for the dielectric layer.

Next, a conductive paste for an internal electrode containing a metal powder, a binder, or the like may be printed on the green sheet for the dielectric layer using a screen printing method, a gravure printing method, or the like in a predetermined thickness to form an internal electrode pattern. Thereafter, the green sheet for the dielectric layer on which the internal electrode pattern is printed may be peeled off from the carrier film, and then green sheets for the dielectric layer on which the internal electrode pattern is printed may be stacked by a predetermined number of layers to form a stack body.

A first metal powder may be further added to the slurry for the dielectric layer to obtain a slurry for a cover portion. The first metal powder may include one or more of Cu, W, Ag, and Zn, and an amount of the first metal powder included in the slurry for the cover portion may be, for example, 1.1 parts by weight to 3.3 parts by weight, relative to 100 parts by weight of the first dielectric material powder. The slurry for the cover portion may be applied and dried on a carrier film to prepare a green sheet for the cover portion, and then stacked above and below the stack body in the first direction.

Thereafter, the stack body may be cut to have a predetermined size of a chip. A binder or the like included in the cut chip may be removed preferably by a binder removal process. Conditions of the binder removal process may be changed depending on a type of binder used, and are not particularly limited. For example, the binder removal process may be carried out at 180° C. or higher and 450° C. or lower for a time period of 0.5 hours or more and 24 hours or less.

The chip in which the binder removal process is performed may be sintered at a temperature of 1100° C. or more and 1300° C. or less, to form a body 110 including a capacitance forming portion Ac including a dielectric layer 111 and an internal electrode (121 and 122), and a cover portion (112 and 113).

Next, an external electrode (131 and 132) may be formed. Third and fourth surfaces 3 and 4 of the body 110 may be dipped in a conductive paste containing metal powder and glass and may be then sintered to form an electrode layer (131*a* and 132*a*). In this case, a sintering temperature may be, for example, 700° C. to 900° C.

When the electrode layer (131*a* and 132*a*) includes a first layer including metal and glass, and a second layer disposed on the first layer and including conductive metal and a resin, the second layer may be formed by applying and drying a conductive resin composition containing a metal powder and a resin on the first layer and then subjecting the same to a curing heat treatment at a temperature of 250° C. to 550° C.

Experimental Example

<Preparation of Sample>

First, Mn as a first minor component, Y as a second minor component, and Si as a third minor component were added to first dielectric material powder particles for forming a dielectric layer 111, and then the first dielectric material powder particles were mixed with an organic solvent and a binder, to prepare a slurry for the dielectric layer.

The slurry for the dielectric layer was applied and dried on a carrier film to prepare a green sheet for the dielectric layer, and a conductive paste for an internal electrode containing Ni powder particles, a binder, or the like was printed in a predetermined thickness on the green sheet for the dielectric layer, to form an internal electrode pattern. Thereafter, green sheets for the dielectric layer on which the internal electrode pattern was printed were peeled from the carrier film and then stacked by a predetermined number of layers to form a stack body.

Next, a slurry for a cover portion in which Cu powder particles were further added to the slurry for the dielectric layer was applied and dried on the carrier film, to prepare a green sheet for the cover portion, and the green sheet for the cover portion was stacked above and below the stack body in the first direction, the stack body was cut to have a predetermined size of a chip, and a binder removal process and a sintering process were performed thereon to form a body 110.

Next, the body 110 was dipped in a conductive paste containing Cu powder particles and glass and then sintered to form electrode layers 131*a* and 132*a*, and plating layers 131*b* and 132*b* on which a Ni plating layer and a Sn plating layer were sequentially formed on the electrode layers were formed to prepare a sample chip.

Sample Nos. 1 to 7 in Table 1 below were prepared in the same manner, except that only amounts of the Cu powder particles included in the slurry for the cover portion were changed in a range of 0 to 3.7 parts by weight, based on 100 parts by weight of the first dielectric material powder.

Next, after obtaining images of cross-sections in the first and second directions cut from a center of the body 110 of the sample chips in the third direction using a scanning electron microscope (SEM), under measurement conditions of acceleration voltage: 10 kV, current: 60 A, and working distance: 8.5 mm, energy dispersive spectroscopy (EDS) was performed on 10 equally spaced points in the first direction disposed in a central region of the cover portion in the second direction. After measuring amounts of Cu at the 10 points, based on 100 mole of an element of B, an average value of the amounts of Cu at the 10 points were illustrated in Table 1 below.

<Heat Evaluation>

Figure 6:
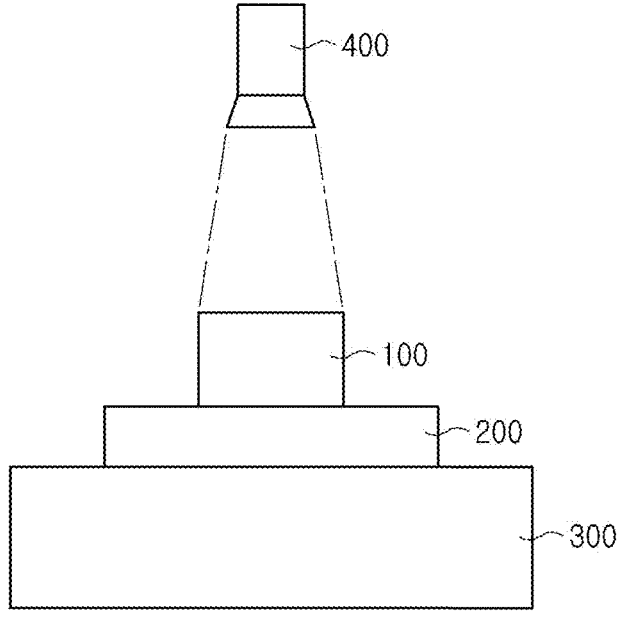
FIG. 6 is a view schematically illustrating a method for evaluating heat dissipation of a multilayer electronic component.

FIG. 6 is a view schematically illustrating a method for evaluating heat dissipation of a multilayer electronic component. As illustrated in FIG. 6, after a multilayer electronic component 100 was mounted on a printed circuit board 200, the printed circuit board 200 on which the multilayer electronic component 100 was mounted was installed on a hot plate 300. Measurement conditions (frequency: 100 kHz, temperature: 105° C., voltage: 630V) were applied using a power supply (keysight E36234A), an oscilloscope (Keysight DSOX1204A), and a source meter (keysight 34972A), and a change in temperature of the multilayer electronic component 100 was measured using a thermal imaging camera 400.

ΔT illustrated in Table 1 below were average values after measuring a change in temperature in five sample chips for each sample number.

<Humidity Reliability and IR Evaluation>

If, after mounting a total of 320 sample chips for each sample number on the printed circuit board and applying a voltage of 630V for 48 hours at a temperature of 85° C. and a relative humidity of 85%, an insulation resistance (IR) value fell below 10% of an initial IR value, it was judged to be defective. Table 1 below lists ratios of defective sample chips relative to the total number of sample chips per sample number.

IR values were measured using an IR measuring device (VITREK QTPro II-950), and were measured under conditions of a voltage of 630V and a measurement time of 60 seconds.

TABLE 1

| Sample No. | Cu Amount (mol) | ΔT(° C.) | Humidity Resistance Reliability(%) | IR(GΩ) |
|---|---|---|---|---|
| 1 | 0 | 9.8 | 0 | 295 |
| 2 | 1 | 9.5 | 0 | 265 |
| 3 | 2 | 7.5 | 0 | 242 |
| 4 | 3 | 6.4 | 0 | 230 |
| 5 | 6 | 5.6 | 0 | 208 |
| 6 | 9 | 4.8 | 0 | 121 |
| 7 | 10 | 4.4 | 6 | 95 |

Referring to Table 1, it can be seen that, since a cover portion of Sample No. 1 did not include a first metal such as Cu or the like, a change in temperature of the sample chip was excessively large. It can be seen that, since Sample No. 2 also included less than 2.0 mole of Cu, based on 100 mole of an element of B, in the cover portion, a change in temperature of the sample chip was still large, and a difference in sample chip temperature change between Sample No. 1 and Sample No. 2 was only 0.3° C.

It can be seen that, since, in Sample No. 7, a cover portion included 10 mole of Cu, based on 100 mole of an element of B, a change in temperature of the sample chip was low, but IR was excessively lowered, and moisture resistance defects thus occurred.

It can be seen that, since, in Samples Nos. 3 to 6, cover portions included 2 to 9 moles of Cu, based on 100 mole of an element of B, changes in temperature of the sample chip itself were low, and IR values were good. In particular, it can be seen that a difference in sample chip temperature change between Sample No. 2 and Sample No. 3 was 2.0° C.

In addition, it can be seen that, since, in Samples Nos. 3 to 5, cover portions included 2 to 6 mole of Cu, based on 100 mole of an element of B, changes in temperature of the sample chip itself were low, and IR values were maintained above 200 GΩ.

The present disclosure is not limited by the above-described embodiments and accompanying drawings, but is intended to be limited by the appended claims. Therefore, various forms of substitution, modification, and change will be possible by those skilled in the art within the scope of the technical spirit of the present disclosure described in the claims, and this will also be said to fall within the scope of the present disclosure.

In addition, the expression 'an embodiment' does not indicate the same embodiment, and is provided to emphasize and describe different unique characteristics. However, an embodiment presented above is not excluded from being implemented in combination with features of another embodiment. For example, even if a matter described in one detailed embodiment is not described in another embodiment, and it can be understood as a description related to another embodiment, unless there is a description contradicting or contradicting the matter in another embodiment.

In addition, expressions such as first and second are used to distinguish one component from another, and do not limit the order and/or importance of the components. In some cases, without departing from the scope of rights, a first element may be named a second element, and similarly, a second element may be named a first element.

As one of the many effects of the present disclosure, heat generated in a multilayer electronic component may be effectively dissipated to improve reliability of the multilayer electronic component.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:

a body including a capacitance forming portion including a dielectric layer and an internal electrode, alternately arranged in a first direction, and a cover portion disposed on both surfaces of the capacitance forming portion opposing the first direction; and an external electrode disposed on outer surface the body and connected to the internal electrode, wherein the cover portion includes a first dielectric material having a perovskite structure represented by chemical formula $ABO_3$, and a first metal including one or more of Cu, W, Ag, and Zn, and wherein, in at least a portion of the cover portion, an amount of the first metal is more than 2.0 mole and 9.0 mole or less, based on 100 mole of an element of B.

2. The multilayer electronic component of claim 1, wherein the first metal comprises Cu.

3. The multilayer electronic component of claim 2, wherein, in the at least a portion of the cover portion, the amount of the first metal is 6.0 mole or less, based on 100 mole of the element of B.

4. The multilayer electronic component of claim 1, wherein the cover portion has a standard deviation of the amount of the first metal of 3.0 mole or less based on 100 mole of the element of B, in the first direction.

5. The multilayer electronic component of claim 1, wherein the first dielectric material comprises a plurality of dielectric grains and a grain boundary disposed between the plurality of dielectric grains adjacent to each other, and at least a portion of the first metal is included in the plurality of dielectric grains.

6. The multilayer electronic component of claim 1, wherein the first dielectric material comprises a plurality of dielectric grains and a grain boundary disposed between the plurality of dielectric grains adjacent to each other, and at least a portion of the first metal is present at the grain boundary.

7. The multilayer electronic component of claim 1, wherein the dielectric layer comprises the first dielectric material, an element of A comprises Ca, and the element of B comprises Zr.

8. The multilayer electronic component of claim 7, wherein the dielectric layer comprises a first minor component including Mn, and in at least a portion of the dielectric layer, an amount of the first minor component is 0.1 mole or more and 2.0 mole or less, based on 100 mole of the element of B.

9. The multilayer electronic component of claim 7, wherein the dielectric layer comprises a second minor component including Y, and in at least a portion of the dielectric layer, an amount of the second minor component is 0.1 mole or more and 2.0 mole or less based on 100 mole of an the element of B.

10. The multilayer electronic component of claim 7, wherein the dielectric layer comprises a third minor component including Si, and wherein, in at least a portion of the dielectric layer, an amount of the third minor component is 0.1 mole or more and 2.0 mole or less, based on 100 mole of the element of B.

11. The multilayer electronic component of claim 1, wherein the first dielectric material comprises $(Ca_{1-x}Sr_x)$ $(Zr_{1-y}Ti_y)O_3$, where x is $0 \leq x < 0.5$, and y is $0 \leq y \leq 0.5$.

12. The multilayer electronic component of claim 1, wherein the dielectric layer does not comprise the first metal.

13. The multilayer electronic component of claim 1, wherein the dielectric layer comprises the first metal, and wherein a concentration of the first metal in the dielectric layer is lower than a concentration of the first metal in the cover portion.

14. The multilayer electronic component of claim 1, wherein the body has first and second surfaces opposing in the first direction, third and fourth surfaces connected to the first and second surfaces and opposing in a second direction, and fifth and sixth surfaces connected to the first to fourth surfaces and opposing in a third direction;

the external electrode is disposed on the third and fourth surfaces; and a maximum size of the multilayer electronic component in the second direction is 3.2 mm or more, and a maximum size of the multilayer electronic component in the third direction is 1.6 mm or more.

* * * * *